(12) United States Patent
Ojo et al.

(10) Patent No.: US 7,009,662 B2
(45) Date of Patent: Mar. 7, 2006

(54) ELECTRONIC CIRCUIT AND METHOD FOR ENHANCING AN IMAGE

(75) Inventors: Olukayode Anthony Ojo, Eindhoven (NL); Tatiana Georgieva Kwaaitaalspassova, Eindhoven (NL); Gerard De Haan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 473 days.

(21) Appl. No.: 09/979,226

(22) PCT Filed: Mar. 20, 2001

(86) PCT No.: PCT/EP01/03136

§ 371 (c)(1),
(2), (4) Date: Nov. 19, 2001

(87) PCT Pub. No.: WO01/74056

PCT Pub. Date: Oct. 4, 2001

(65) Prior Publication Data

US 2003/0007100 A1 Jan. 9, 2003

(30) Foreign Application Priority Data

| Mar. 24, 2000 | (EP) | ............................................. 00201079 |
| Jun. 13, 2000 | (EP) | ............................................. 00202058 |
| Feb. 13, 2001 | (EP) | ............................................. 01200503 |

(51) Int. Cl.
*H04N 5/21* (2006.01)
*H04N 5/213* (2006.01)
*H04N 5/217* (2006.01)

(52) U.S. Cl. ...................... 348/625; 348/241; 348/252; 348/606; 348/607; 348/622; 382/263

(58) Field of Classification Search ......... 348/606–607, 348/618, 622–625, 627–630, 241–242, 252–253, 348/533; 382/263–264; H04N 5/21, 5/213, H04N 5/217
See application file for complete search history.

(56) References Cited

U.S. PATENT DOCUMENTS

| 4,825,289 | A | * | 4/1989 | Ohta ........................... 348/622 |
| 4,926,261 | A | * | 5/1990 | Matsumoto et al. ......... 348/622 |
| 5,038,388 | A | * | 8/1991 | Song ........................... 382/266 |
| 5,132,795 | A | * | 7/1992 | Campbell .................... 348/447 |
| 5,903,680 | A | | 5/1999 | De Haan et al. |
| 6,072,538 | A | * | 6/2000 | Keating ...................... 348/625 |
| 6,094,511 | A | * | 7/2000 | Metcalfe et al. ............. 382/260 |
| 6,600,518 | B1 | * | 7/2003 | Bakhmutsky et al. ....... 348/625 |
| 2002/0181798 | A1 | * | 12/2002 | Ojo et al. ................... 382/260 |
| 2002/0186894 | A1 | * | 12/2002 | Ferguson .................... 382/261 |

* cited by examiner

*Primary Examiner*—Brian P. Yenke
(74) *Attorney, Agent, or Firm*—Edward W. Goodman

(57) ABSTRACT

An electronic circuit 100 and method for enhancing an image, in particular, for use in TV-applications, includes a N-dimensional image enhancement filter 130 for receiving an image signal and at least one further image signal, all image signals representing different pixels of said image. An intermediate signal output from the N-dimensional image enhancement filter 130 is combined with a high-frequency component of the image signal in order to generate an enhanced image output signal. The electronic circuit also includes at least one adjusting element 140-1, 140-2 for adjusting the intermediate signal and/or said high-frequency component in response to a determined amount of image enhancement applied to the image signal in the image enhancement filter 130 before being combined.

13 Claims, 3 Drawing Sheets

ELECTRONIC CIRCUIT AND METHOD FOR ENHANCING AN IMAGE

BACKGROUND OF THE INVENTION

1. Field of the Invention

The invention relates to an electronic circuit and method for enhancing an image, in particular, for television applications.

2. Description of the Related Art

FIG. 4 shows such a circuit known in the art, e.g., substantially from U.S. Pat. No. 5,903,680. The circuit comprises a high-pass filter 110' for separating a high-frequency component from an image signal, representing an image pixel Pn of the image. The image signal as well as at least one further image signal representing a neighbor pixel Pn−j, Pn+k, being located in a N-dimensional environment of said image pixel, are low-pass filtered by low-pass filters 120-2, 120-1, 120-3, respectively. The low-pass-filtered image signal is further filtered by a N-dimensional image enhancement filter 130 under consideration of the low-pass-filtered further image signals in order to generate an intermediate image signal. Finally, the intermediate image signal and the high-frequency component are mathematically combined by a combining element 150 in order to generate an enhanced image output signal of the electronic circuit.

The circuit shown in FIG. 4 implements a concept of how to improve the subjective quality of the output signal of the image enhancement filter 130. More specifically, according to FIG. 4, only low-frequency components of the image signal and of the further image signals are input to the N-dimensional image enhancement filter 130, while the high frequency component is bypassed. This is done because filtering of only the low frequency component is more effective than carrying out filtering on the entire spectrum of the image signals. Moreover, adding the bypassed high frequency component to the intermediate output signal of the image enhancement filter 130 improves the dynamic behavior of the whole electronic circuit and reduces the impression of blurring, which is prevalent in spatial image enhancement filters having low-pass characteristic. Further, by applying this concept, the impression of sharpness in the image input to the image enhancement filter 130 is preserved in the image after being processed by the image enhancement filter.

However, the circuit according to FIG. 4 and the described concept, have the disadvantage that they do not work economically if the input image signals are scanned in a noncontiguous fashion or in any direction other than parallel or orthogonal to the horizontal axis. In particular, when a 2- or 3 or, in general, N-dimensional image enhancement filter is used, the costs become prohibitive, since then the low-pass filtering must be done for each tap of the filter, that is for the image signal as well as for each of the further image signals.

SUMMARY OF THE INVENTION

Starting from that prior art, it is the object of the invention to provide an improved electronic circuit and an improved method for enhancing an image, such that the costs for their implementation are reduced without loss of quality in the output signal.

This object is achieved for the electronic circuit known in the art by providing means for determining an amount of image enhancement applied to the image pixel by the N-dimensional image enhancement filter and by at least one adjusting element for adjusting the intermediate signal and/or the high frequency component in response to the determined amount of image enhancement before being provided to the combining element.

The image enhancement filter, according to the invention, operates on the entire frequency spectrum of the received image signal as well as of the received further image signal(s). Thus, the electronic circuit does not require low-pass filters, which were necessary in the prior art, for filtering the image signal as well as the further image signal(s) before being input to the image enhancement filter. Consequently, the costs for these low-pass-filters as well as for their implementation do not occur in the electronic circuit according to the invention. More specifically, in the case that a N-dimensional image enhancement filter, with N being an integer equal to or greater than one, is used which evaluates a plurality of M further image signals, then the costs for M low-pass filters can be saved.

According to the present invention, the image signal, representing the image pixel but not a neighbor pixel thereof, is input to the image enhancement filter with its complete frequency spectrum. A high-frequency component of the image signal is generated by a high-pass filter only for bypassing the image enhancement filter. The high-pass filter enables an individual selection of the high frequency component.

The quality of the enhanced image output signal generated by the electronic circuit is as least as good as the quality of the signal generated in the prior art. More specifically, by controlling the adjusting elements, the impression of sharpness of an image processed by the image enhancement filter is preserved; this is similar to the prior art but here this is achieved, not with many low-pass filters, but with only one high-pass filter.

According to one embodiment of the invention, the N-dimensional image enhancement filter is embodied as a sharpness enhancement filter. In this case, the amount of image enhancement substantially corresponds to an amount of sharpness enhancement applied to the image signal while being filtered in the image enhancement filter.

Alternatively, according to a preferred embodiment, the image enhancement filter is embodied as a noise filter. In that case, the amount of image enhancement substantially corresponds to an amount of noise reduction applied to the image signal while being filtered in the image enhancement filter.

BRIEF DESCRIPTION OF THE DRAWINGS

With the above and additional objects and advantages in mind as will hereinafter occur, the subject invention will be described with reference to the accompanying drawings, in which.

DESCRIPTION OF THE PREFERRED EMBODIMENTS

Figure 1:
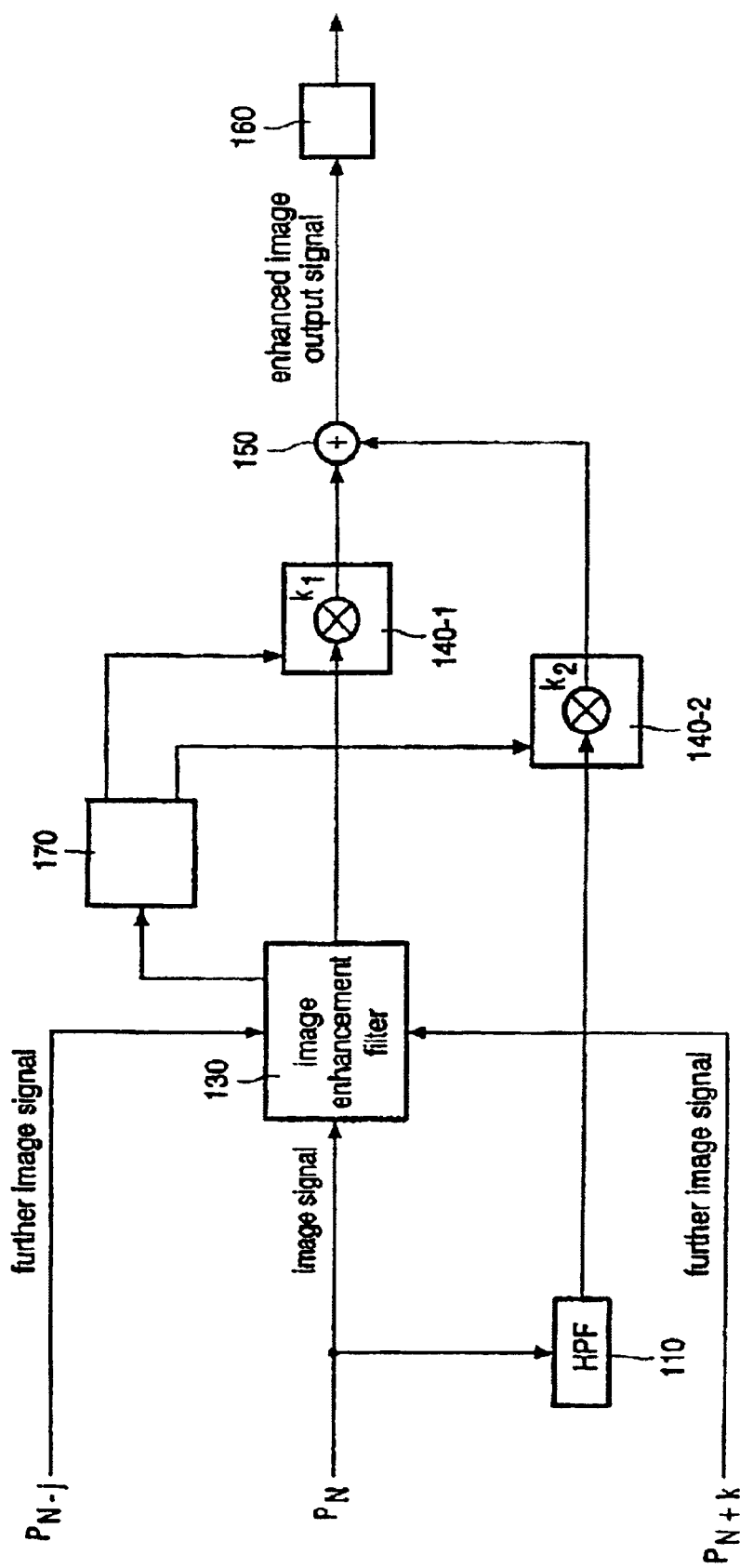
FIG. 1 shows a first embodiment of an electronic circuit for enhancing an image according to the invention.

FIG. 1 shows a first embodiment of an electronic circuit 100 for enhancing an image. An image signal, representing an image pixel of said image, is input to an N-dimensional image enhancement filter 130 for being filtered under consideration of at least one, also received, further image signal, which represents a neighbor pixel being located in a N-dimensional predefined environment of said image pixel. The result of said filtering process is an intermediate image signal output by said N-dimensional image enhancement filter 130. The intermediate signal is provided to a first adjusting element 140-1 for multiplication with a first multiplier K1.

Said image signal is further input to a high-pass filter 110 which selects a high frequency component from said input image signal. Said high frequency component is input to a second adjusting element 140-2 for multiplication with a second multiplier K2.

Both multipliers K1 and K2 are individually adjusted in response to a current amount of image enhancement applied to said image signal in said N-dimensional image enhancement filter 130. Said amount of image enhancement is determined by means 170. The multipliers K1 and K2 are, in general, adjusted such that the sharpness of the image signal input to said image enhancement filter 130 is preserved at the output; note that in the case that the filter 130 is embodied as a noise filter, the sharpness usually is reduced. The sharpness is preserved by preferably adjusting the multipliers K1, K2 such that the gain of the image enhancement filter 130 is set to one; that is, such that K1+K2=1. However, in practice, K1 might also be set to 1 while K2 is varied. In such a case, the gain is greater than 1 and clipping means must be provided.

The multiplied intermediate image signal as output by the adjusting element 140-1 and the multiplied high-frequency component as output by said adjusting element 140-2 are mathematically combined, e.g., added, by a combining element 150 for generating an enhanced image output signal of the electronic circuit 100.

The enhanced image output signal is preferably provided to an overflow preventing filter 160 ensuring that there is no overflow in said enhanced image output signal.

In the following, the operation of the image enhancement filter 130 and the adjusting of the multipliers K1 and K2 are explained in more detail. The explanation is given for the case that the image enhancement filter 130 is embodied preferably, namely, as noise filter.

Noise filtering is, e.g., done by carrying out a weighted averaging operation. According to that operation, the grey value of each neighbor pixel in a predefined N-dimensional environment of said image pixel is determined and compared with the grey value of the image pixel represented by said image signal. The comparison is done by subtracting the grey value of each neighbor pixel from the grey value of the only one image pixel. In that way, for each neighbor pixel, a grey-value difference is defined. Each of the such-defined grey-value differences serves for defining a weight for the respective neighbor pixel. The intermediate image signal output by the image enhancement filter is finally, in general, generated by linearly combining the further image signals, representing respective neighbor pixels, being weighted with their respective weights.

However, the linear combination is usually not made up of all further image signals representing all neighbor pixels in the N-dimensional environment of the image pixel. Instead, the linear combination is preferably only made up of those neighbor pixels / further image signals, the grey value deviation of which, relative to the original pixel, is below a predetermined threshold value. The number of neighbor pixels fulfilling this requirement is continually calculated by the means 170, which may be part of the image enhancement filter 130. This number serves as a preferred indicator for the amount of noise filtering applied to the image signal in said image enhancement filter 130 at a time. As mentioned above, the multipliers K1 and K2 are generally adjusted in response to said amount of noise filtering; more specifically, in the case of weighted averaging, they are adjusted in response to said determined number of neighbor pixels contributing to said weighted averaging method. The neighbor signals whose calculated grey value differences exceed said threshold value, neither contribute to the linear combination nor are considered for determining the applied amount of image enhancement.

Alternatively to said weighted averaging method, the noise filter, corresponding to the image enhancement filter 130, is embodied as low-pass filter, preferably as recursive first-order temporal low-pass filter. In that case, the amount of image enhancement applied to the image signal in said noise filter is preferably derived from the filter coefficients of said low-pass filter.

Figure 2:
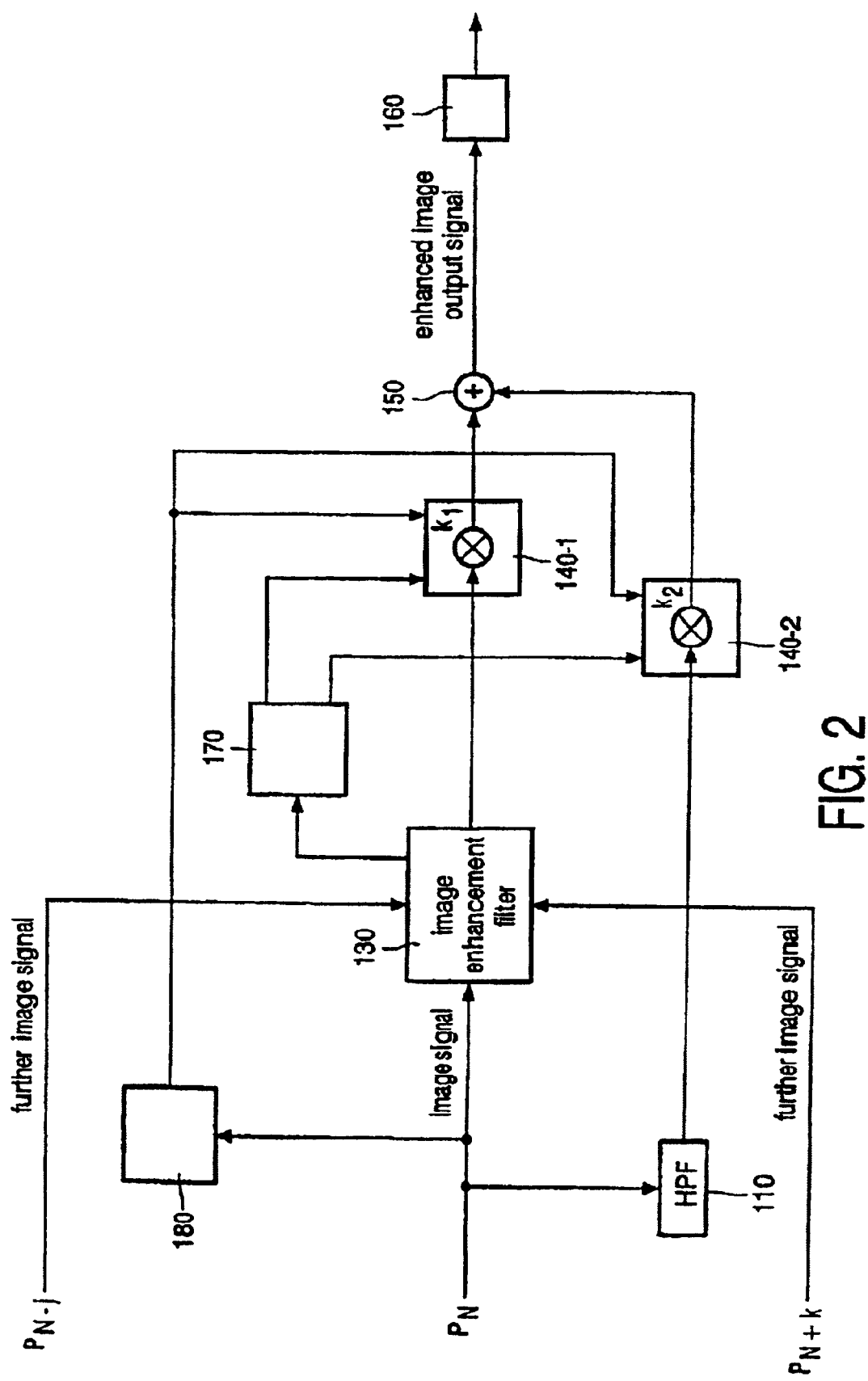
FIG. 2 shows a second embodiment of the electronic circuit for enhancing an image according to the invention.

FIG. 2 shows a second embodiment of the electronic circuit 100' according to the invention. In the second embodiment, the electronic circuit 100' substantially corresponds to the electronic circuit 100 in the first embodiment. Thus, identical devices are referred to by the same reference numerals.

However, the second embodiment differs from the first embodiment in that it further comprises means 180 for continually determining an amount of a predefined property of the image signal before being input to said image enhancement filter 130. Advantageously, said determined amount serves for additionally controlling at least one of the adjusting elements 140-1' or 140-2', that is, for adjusting the multipliers K1' or K2'.

Said properties are, e.g., the level of noise or the dynamic range of the image signal or the sharpness of an image represented by the image signal. The determination of the amount of a property is preferably carried out in real time.

Figure 3:
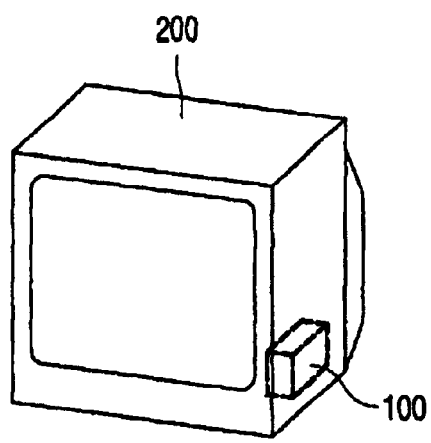
FIG. 3 shows a display apparatus according to the invention.
Figure 4:
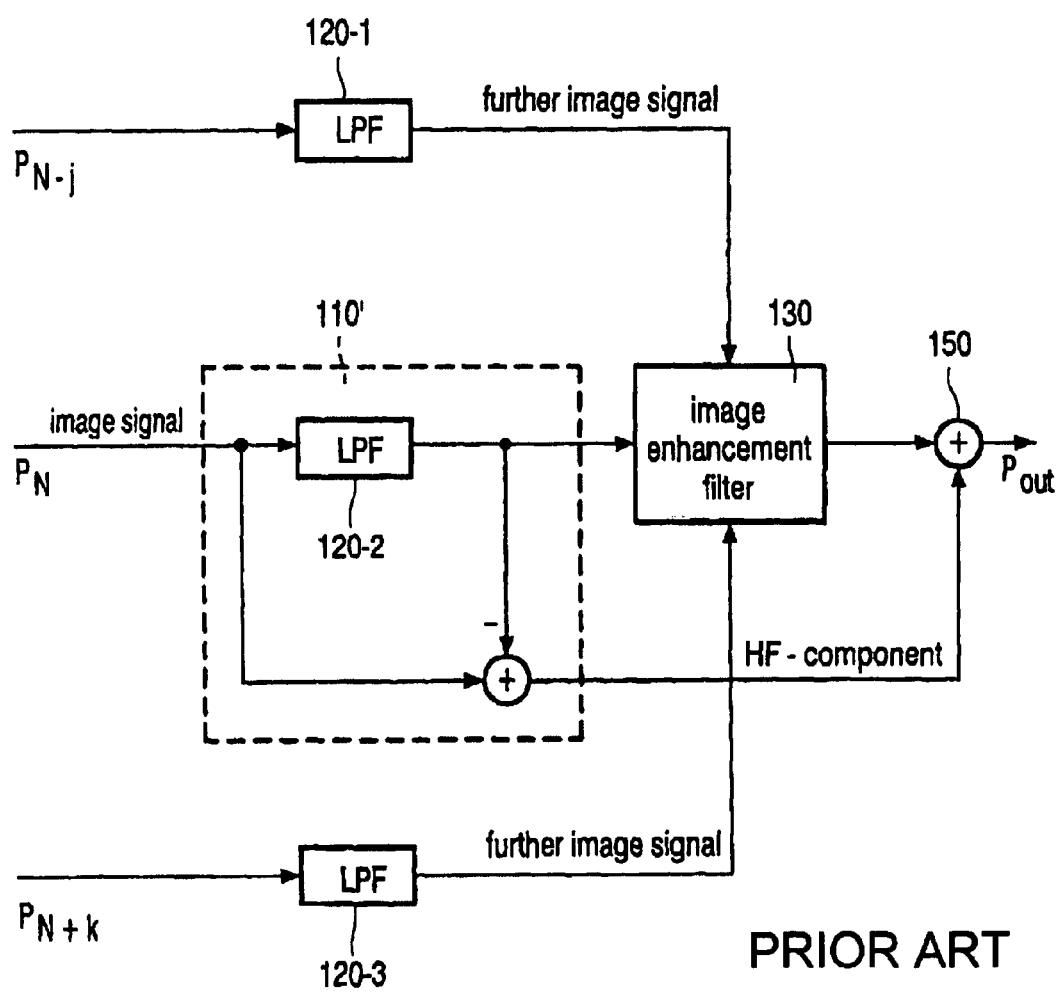
FIG. 4 shows an electronic circuit for enhancing an image as known in the art.

FIG. 3 shows a display apparatus 200, e.g., a television set or a computer monitor, incorporating the electronic circuit 100. Advantageously, said electronic circuit 100 enhances input images before they are displayed by said display apparatus.

What is claimed is:

1. An electronic circuit for enhancing an image by filtering a received image signal, representing an image pixel of said image, the electronic circuit comprising:

a high-pass filter for separating a high-frequency component from said image signal;

a N-dimensional image enhancement filter for receiving and filtering said image signal under consideration of at least one further image signal representing a neighbor pixel, being located in a N-dimensional environment of said image pixel, in order to generate an intermediate image signal; and a combining element for mathematically combining said intermediate image signal with said high-frequency component of the image signal in order to generate an enhanced image output signal of the electronic circuit, characterized in that said electronic circuit further comprises:

means for determining an amount of image enhancement applied to said image pixel by said N-dimensional image enhancement filter; and at least one adjusting element for adjusting said intermediate signal and/or said high-frequency component in response to said determined amount of image enhancement before being provided to said combining element.

2. The electronic circuit as claimed in claim 1, characterized in that the N-dimensional image enhancement filter is a sharpness enhancement filter.

3. The electronic circuit as claimed in claim 1, characterized in that the N-dimensional image enhancement filter is a noise filter.

4. The electronic circuit as claimed in claim 3, characterized in that the noise filter carries out a weighted averaging operation on the image signal.

5. The electronic circuit as claimed in claim 4, characterized in that the amount of image enhancement applied to said image signal by said noise filter depends on the number of neighbor pixels considered in said weighted averaging operation.

6. The electronic circuit as claimed in claim 3, characterized in that the noise filter is a recursive first order temporal low-pass filter.

7. The electronic circuit as claimed in claim 6, characterized in that the amount of image enhancement applied to said image signal by said noise filter is derived from current filter coefficients of said low-pass filter.

8. The electronic circuit as claimed in claim 1, characterized in that the electronic circuit further comprises means for determining an amount of a predefined property of said image signal, said determining means additionally controlling the adjusting element in response to said determined amount of the predefined property.

9. The electronic circuit as claimed in claim 8, characterized in that said property is a level of noise or a dynamic range of the image signal or a sharpness of an image represented by the image signal.

10. The electronic circuit as claimed in claim 8, characterized in that said means for determining the amount of the property carries out said determination in real time.

11. The electronic circuit as claimed in claim 1, characterized in that the electronic circuit further comprises an overflow preventing circuit connected in series after said combining element for preventing an overflow in said enhanced image output signal.

12. A display apparatus for displaying images comprising the electronic circuit as claimed in claim 1 for enhancing said images before being displayed.

13. A method for enhancing an image by operating on a received image signal representing an image pixel of said image, the method comprising the steps of:

separating a high-frequency component from said image signal;

filtering the image signal under consideration of at least one further image signal, representing a neighbor pixel, being located in a N-dimensional environment of said image pixel, for enhancing the image and generating an intermediate image signal; and combining said intermediate image signal with said high-frequency component of the image signal in order to generate an enhanced image output signal of the electronic circuit, characterized in that said method further comprises the steps of:

determining an amount of image enhancement applied to said image pixel in said filtering step; and adjusting said high-frequency component and/or said intermediate signal in response to said amount of image enhancement before being combined.

\* \* \* \* \*